US009056696B1

(12) United States Patent
Reyes

(10) Patent No.: US 9,056,696 B1
(45) Date of Patent: Jun. 16, 2015

(54) PORTFOLIO WITH INTEGRATED COMPUTER AND ACCESSORY POCKETS

(71) Applicant: Armando Reyes, Miami, FL (US)

(72) Inventor: Armando Reyes, Miami, FL (US)

( * ) Notice: Subject to any disclaimer, the term of this patent is extended or adjusted under 35 U.S.C. 154(b) by 0 days.

(21) Appl. No.: 13/873,694

(22) Filed: Apr. 30, 2013

(51) Int. Cl.
*A45C 3/02* (2006.01)
*B65D 25/20* (2006.01)

(52) U.S. Cl.
CPC ..................................... *B65D 25/20* (2013.01)

(58) Field of Classification Search
USPC ......... 206/320, 425, 576, 216, 223, 224, 232; 190/110, 109
See application file for complete search history.

(56) References Cited

U.S. PATENT DOCUMENTS

| | | | | |
|---|---|---|---|---|
| 1,705,149 A * | 3/1929 | Brady | | 190/111 |
| 4,609,084 A * | 9/1986 | Thomas | | 190/110 |
| 5,105,338 A | 4/1992 | Held | | |
| 5,160,001 A * | 11/1992 | Marceau | | 190/102 |
| 5,607,054 A | 3/1997 | Hollingsworth | | |
| D383,492 S * | 9/1997 | Siemon et al. | | D19/26 |
| 5,826,714 A * | 10/1998 | Martin | | 206/232 |
| 5,826,770 A * | 10/1998 | Chuang | | 224/607 |
| 5,911,262 A * | 6/1999 | Steinhart | | 150/103 |
| 6,026,961 A * | 2/2000 | McCarthy et al. | | 206/576 |
| 6,109,442 A * | 8/2000 | Roegner | | 206/581 |
| 6,149,001 A * | 11/2000 | Akins | | 206/320 |
| 6,244,627 B1 | 6/2001 | Wolff et al. | | |
| 6,264,029 B1 * | 7/2001 | Motson | | 206/320 |
| D469,252 S * | 1/2003 | Su | | D3/289 |
| D472,385 S * | 4/2003 | Bauer | | D3/279 |
| 6,604,618 B1 | 8/2003 | Godshaw et al. | | |
| 6,871,739 B2 | 3/2005 | Lopez | | |
| 6,892,880 B2 * | 5/2005 | Nieves | | 206/320 |
| 6,967,836 B2 | 11/2005 | Huang et al. | | |
| D529,717 S * | 10/2006 | Brancky | | D3/285 |
| D535,100 S * | 1/2007 | Suppancig | | D3/283 |
| D535,101 S * | 1/2007 | Suppancig | | D3/289 |
| 7,281,698 B2 | 10/2007 | Patterson, Jr. | | |
| D560,361 S * | 1/2008 | Huang | | D3/301 |
| D568,047 S * | 5/2008 | Brancky | | D3/284 |
| 7,414,833 B2 * | 8/2008 | Kittayapong | | 361/679.27 |
| 7,467,695 B2 * | 12/2008 | Gormick et al. | | 190/111 |
| 8,225,928 B2 | 7/2012 | Perrier et al. | | |
| D666,815 S * | 9/2012 | Janus | | D3/274 |
| D669,480 S | 10/2012 | Piedra et al. | | |
| 8,662,269 B2 * | 3/2014 | Shor et al. | | 190/109 |
| 2003/0021087 A1 | 1/2003 | Lunsford | | |
| 2004/0134813 A1 * | 7/2004 | Domotor | | 206/320 |
| 2006/0196744 A1 * | 9/2006 | Greiner | | 190/110 |
| 2010/0294683 A1 * | 11/2010 | Mish et al. | | 206/320 |
| 2011/0203955 A1 | 8/2011 | Fasula | | |
| 2012/0088557 A1 | 4/2012 | Liang | | |
| 2012/0118210 A1 | 5/2012 | Laughlin et al. | | |
| 2012/0240521 A1 * | 9/2012 | Johnson | | 53/396 |
| 2012/0325702 A1 * | 12/2012 | Gallagher et al. | | 206/320 |

FOREIGN PATENT DOCUMENTS

JP 10201512 A 8/1998

\* cited by examiner

*Primary Examiner* — Steven A. Reynolds
(74) *Attorney, Agent, or Firm* — Albert Boards, P.A.

(57) ABSTRACT

A portfolio with integrated computer and accessory pockets, having a case having a zipper assembly, and an exterior pocket assembly having a cooperative dimension and shape to receive an electronic device. The electronic device is a cell phone, computer, or calculator. The exterior pocket assembly comprises a rear wall, a front wall, and first and second sidewalls. The rear wall has an edge. The front wall and first and second sidewalls are shorter than the rear wall. A flap extends from the edge a predetermined distance to overlap the front wall. The rear wall is attached to a front exterior face of the case.

6 Claims, 4 Drawing Sheets

PORTFOLIO WITH INTEGRATED COMPUTER AND ACCESSORY POCKETS

BACKGROUND OF THE INVENTION

1. Field of the Invention

The present invention relates to portfolios, and more specifically, to portfolios having integrated computer pockets and accessory pockets.

2. Description of the Related Art

Applicant believes that one of the closest references corresponds to U.S. Patent Application Publication No. 20120118210 A1, published on May 17, 2012 to Laughlin, et al. for a foldaway desk (FAD) information station/desk caddy. However, it differs from the present invention because Laughlin, et al. teaches a Fold Away Desk that folds-up to a compact portfolio. This mobile office can stand up in cube form providing an organized, central place of order and privacy, which can be folded and safely stored away with ease. With technology unveiling miniature and condensed products every day, the Fold Away Desk offers the solution to clearing clutter. The stylish scratch-proof design ensures safe table top display while being attractive enough for travel. When folded it can also act as a multi use laptop or IPAD case. The Emergency Fold Away version is essential for the increasing worldwide weather crisis evacuations. Instead of losing a lifetime of memories, the user can be prepared for fast, emergency evacuation with photo memory cards, flash drives and critical documents all stored in one organized place and ready to go with a moment's notice.

Applicant believes that another reference corresponds to U.S. Patent Application Publication No. 20120088557 A1, published on Apr. 12, 2012 to Liang for an IPad and Keypad Cover Structure. However, it differs from the present invention because Liang teaches an iPad and keypad cover structure that includes an iPad leather cover, a cover board, and a foldable member to connect the iPad leather cover and the cover board. The cover board has a fold line at a central portion thereof and at least one fixing tongue at an outer edge thereof. A keypad is provided on an inner side of the cover board. The iPad leather cover has a chamber at an inner side thereof, and at least one transverse engaging piece disposed on an outer side thereof. The fixing tongue is inserted in the engaging piece of the iPad leather cover to secure the iPad and keypad cover structure when the cover board is folded face-to-face or back-to-back relative to the iPad leather cover. An iPad and the keypad are received therein face-to-face when the cover board is folded face-to-face relative to the iPad leather cover. When the keypad is disengaged from the cover board, the cover board can be reversely folded about the fold line and the fixing tongue is inserted in the engaging piece and the edge of the cover board is against the bottom edge of the engaging piece to form a triangular support base for supporting the iPad at an appropriate angle. Two ends of a strap are connected to two loops at two ends of the cover board and two support bands at the two ends of the cover board are adhered to outer adhesive straps provided on an outer side of the iPad leather cover for the user to hang on the shoulder or the neck. When the iPad leather cover is opened, the two support bands are used to support the iPad for the user to touch the iPad screen. The iPad can be carried with ease and the keypad can be taken along.

Applicant believes that another reference corresponds to U.S. Patent Application Publication No. 20110203955 A1, published on Aug. 25, 2011 to Fasula for a multipurpose IPad case. However, it differs from the present invention because Fasula teaches a multipurpose iPAD case that opens to form a light/privacy shade around the iPAD and folds up around itself to create a protective case with a shoulder strap, worn to make the iPAD conveniently portable. It is made of rigid and pliable materials such as padded board and leather or any pliable material. The dimensions and folds of the rigid shell are determined by the iPad size. When opened as sun/privacy shade, the hood fits snugly at an adjustable angle with a rigid pocket to lean on. This pocket is adjusted by cords that pierce the main body of the case, going through the rigid pocket and adjusted with a cord lock for desired angle to view the screen. When placed in the center panel the iPad is slipped into a bottom and top piece of elastic, which is sewn, to the interior of main body to secure the iPad in position. When it's time to wrap it up, the iPad is placed in the center panel of the case, the side panels fold over the iPad, the bottom is folded over side panels, then the front of case is folded over and attached to the bottom with a triangular shaped tab. The adjustable shoulder strap is sewn to the side spines of the main body for transport.

Applicant believes that another reference corresponds to U.S. Patent Application Publication No. 20030021087 A1, published on Jan. 30, 2003 to Lunsford for an electronically enabled encasement for a handheld computer. However, it differs from the present invention because Lunsford teaches an electronically enabled encasement for a handheld computer. The encasement includes an encasement portion configured to cover at least a portion of the handheld computer, including a front surface of the handheld computer providing access to a display; a spine engageable with an accessory slot of the handheld computer to detachably couple the encasement with the handheld computer; a connector to electronically connect the encasement to the handheld computer; and at least one electronic component embedded in the encasement portion. The encasement may also include a wireless communication port such a radio frequency transmitter or an IR transceiver.

Applicant believes that another reference corresponds to U.S. Pat. No. 8,225,928 B1 issued to Perrier, et al. on Jul. 24, 2012 for an electronic device cases with integrated cleaning component. However, it differs from the present invention because Perrier, et al. teaches cases for electronic devices, such as an iPad, which include an integrated cleaning component configured to wipe one or more surfaces of an electronic device. In some embodiments, the integrated cleaning component is configured to automatically wipe the surface(s) of the electronic device as it is inserted into or removed from the case. The integrated cleaning component of some embodiments include strips of material configured to engage the surface of the electronic device as it is inserted and/or removed from the case and to wipe or scrub away foreign material. The cleaning component can include various different materials to target primary removal of a particular foreign material (e.g., fingerprints, dirt, dust, oils, etc.). Other embodiments provide integrated storage of the integrated cleaning component, which can easily be removed by a user to wipe the surface(s) of the electronic device.

Applicant believes that another reference corresponds to U.S. Pat. No. 7,281,698 B1 issued to Patterson, Jr. on Oct. 16, 2007 for a multi-positionable notebook computer case. However, it differs from the present invention because Patterson, Jr. teaches a carrying case for an electronic device, such as a tablet personal computer, and more specifically a case that allows a user to selectively position a display screen of the tablet personal computer by rotation coupled with angular support. The case is easily adapted for use with many types and models of personal electronic devices and may be utilized to view the display screen in a plurality of orientations.

Applicant believes that another reference corresponds to U.S. Pat. No. 6,967,836 B1 issued to Huang, et al. on Nov. 22, 2005 for a device for accommodating a tablet PC. However, it differs from the present invention because Huang, et al. teaches a device for accommodating a tablet computer that includes a first sidewall plate and a second sidewall plate that is disposed corresponding to the first sidewall plate. The first sidewall plate and second sidewall plate define a space for accommodating the tablet computer. A supporting mechanism comprises a first pivot piece and a second pivot piece, both of which having one end being pivotally installed at an inner side of the first sidewall plate. The first pivot piece and second pivot piece rotate between a close position and an angled use position with respect to the first sidewall plate. When the first pivot piece and second pivot piece are in the angled use position, the second pivot piece is supported and positioned by the first pivot piece so that the second pivot piece can support the tablet PC.

Applicant believes that another reference corresponds to U.S. Pat. No. 6,871,739 B1 issued to Lopez on Mar. 29, 2005 for foldable padded case for a personal computer. However, it differs from the present invention because Lopez teaches a foldable carrying case for a notebook computer which has two states, an open state wherein the notebook computer can be used on the open case, and a closed state wherein the notebook computer can be transported with the computer being protected with padding on all 6 faces of the computer. The computer case is sized closely to the dimensions of the computer to provide a carrying case that is approximates the dimensions of the case plus the thickness of padding.

Applicant believes that another reference corresponds to U.S. Pat. No. 6,604,618 B1 issued to Godshaw, et al. on Aug. 12, 2003 for a computer protection and carrying case. However, it differs from the present invention because Godshaw, et al. teaches a computer carrying case formed from a single set of connected panels foldable around personal computers or other items having a variety of sizes of dimensions including semi-rigid front and back panels connected by oversized, flexible or living hinges and connecting flyer.

Applicant believes that another reference corresponds to U.S. Pat. No. 6,244,627 B1 issued to Wolff, et al. on Jun. 12, 2001 for a folder with overlapping windows. However, it differs from the present invention because Wolff, et al. teaches a sheet holder, a first panel defining a first window having a first window area, and a second panel defining a second window having a second window area. The first and second panels are joined by at least one hinge, such that the first and second panels are foldable about the hinge to a folded position with the first panel disposed over the second panel. In the folded position, the first and second windows are in overlap with each other such that the first window area overlaps substantially less than the entire second window area.

Applicant believes that another reference corresponds to U.S. Pat. No. 5,607,054 B1 issued to Hollingsworth on Mar. 4, 1997 for a folio carrying case for a notebook computer. However, it differs from the present invention because Hollingsworth teaches a carrying case for a notebook computer that includes front and back panels configured to cover opposite sides of the notebook computer, a top panel flexibly connecting top edges of the front and back panels, a bottom panel flexibly connected to a bottom edge of the back panel, a closure flap flexibly connected to a bottom edge of the bottom panel and overlapping a bottom edge of the front cover when the carrying case is in a closed position folded around the notebook computer, and a pair of tabs depending from opposed lateral edges of the front panel toward the back panel when the carrying case is in a closed position. In the closed position, the carrying case serves as a folio to protectively cover the notebook computer and, in an open position, can also serve as a computer stand supporting the notebook computer in an ergonomic position.

Applicant believes that another reference corresponds to U.S. Pat. No. 5,105,338 B1 issued to Held on Apr. 14, 1992 for a computer portfolio with a laptop computer releasably secured to brackets. However, it differs from the present invention because Held teaches a computer portfolio including two side panels of soft material secured along a fold line for folding between an open position and a closed position in which the panels are face to face to form an enclosure. One of the side panels has a rigid base plate secured in a pocket between inner and outer layers of the panel, and mounting brackets project from the base plate through the inner layer. A laptop computer is releasably secured to the mounting brackets.

Applicant believes that another reference corresponds to U.S. Pat. No. D669480 B1 issued to Piedra, et al. on Oct. 23, 2012 for a tablet computer case. However, it differs from the present invention because Piedra, et al. claims the ornamental design for a tablet computer case.

Applicant believes that another reference corresponds to Japanese Patent No. JP 10201512 A issued to Akihiro on Aug. 4, 1998 for a case for portable personal computer or the like. However, it differs from the present invention because Akihiro teaches a cover CV that covers the upper surface, side faces and lower surface of a personal computer in the style of a system notebook with a front cover CV1, lower surface cover part CV2 and side face cover part CV3. On both the sides of lower surface cover part CV2, side guards SP1 and SP2 are provided for preventing the deviation of personal computer to the outside of cover. Besides, a band BA is detachably attached through a jumper hook JH to the lower surface cover part CV2. The front cover part CV1 is provided with a band stopper BS for fixing the band BA and inside that stopper, a penholder or a document pocket is provided.

Other patents describing the closest subject matter provide for a number of more or less complicated features that fail to solve the problem in an efficient and economical way. None of these patents suggest the novel features of the present invention.

SUMMARY OF THE INVENTION

The instant invention is a portfolio with integrated computer and accessory pockets, comprising a case having a zipper assembly, and an exterior pocket assembly having a cooperative dimension and shape to receive an electronic device. The electronic device is a cell phone, computer, or calculator. The exterior pocket assembly comprises a rear wall, a front wall, and first and second sidewalls. The rear wall has an edge. The front wall and first and second sidewalls are shorter than the rear wall. A flap extends from the edge a predetermined distance to overlap the front wall. The rear wall is attached to a front exterior face of the case.

The case comprises a front exterior face and a rear exterior face connected to each other by a spine at an exterior longitudinal side. The front exterior face and the rear exterior face comprise first and second sidewalls respectively. Assembled onto the first and second sidewalls is the zipper assembly comprising zipper teeth. The zipper assembly comprises a slide with a pull-tab.

The case further comprises a front interior face and a rear interior face connected to each other by an interior spine face at an interior longitudinal side. Mounted onto the front interior face is an interior pocket having a cooperative dimension and shape to receive business cards, and/or an electronic device. The front interior pocket comprises a front wall having a transparent window, an end, and first and second sidewalls. The end and the first and second sidewalls are attached to the front interior face. The front interior face has a slot assembly comprising at least one smaller slot and at least one larger slot having a cooperative dimension and shape to receive debit cards, credit cards, and/or business cards. The at least one larger slot is vertically aligned with the interior pocket.

The interior spine face has writing instrument fasteners mounted thereon.

The case comprises an interior compartment assembly that is affixed and cooperates with the rear interior face. The interior compartment assembly comprises a cover comprising an edge and at least one pocket perpendicular to the at least one smaller slot and the at least one larger slot. The at least one pocket having a cooperative dimension and shape to fit documents therein. The rear interior face and the interior compartment assembly comprising an interior face define a cavity having a cooperative dimension and shape to store at least one computer, at least one laptop, at least one electronic tablet, or at least one document therein. The rear interior face comprises elastic bands disposed diagonally in corners of the cavity to secure the at least one computer, at least one laptop, at least one electronic tablet, or at least one document within.

It is therefore one of the main objects of the present invention to provide a portfolio with integrated computer and accessory pockets.

It is another object of this invention to provide a portfolio with integrated computer and accessory pockets that comprises an exterior pocket attached thereto and an interior section to receive an iPad, or any other tablet-like therein.

It is another object of this invention to provide a portfolio with integrated computer and accessory pockets, which exterior pocket has cooperative dimensions and shape to receive a cell phone therein.

It is another object of this invention to provide a portfolio with integrated computer and accessory pockets, which interior iPad (or tablet) section comprises locking means to secure the iPad (or tablet) in place and a cover board to cover the iPad (or tablet) screen before close the portfolio.

It is another object of this invention to provide a portfolio with integrated computer and accessory pockets comprising other interior means to receive supplies, such as pens, cards, paper pads, post-it notes, etc.

It is another object of this invention to provide a portfolio with integrated computer and accessory pockets that is volumetrically efficient for carrying, transporting, and storage.

It is another object of this invention to provide a portfolio with integrated computer and accessory pockets, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
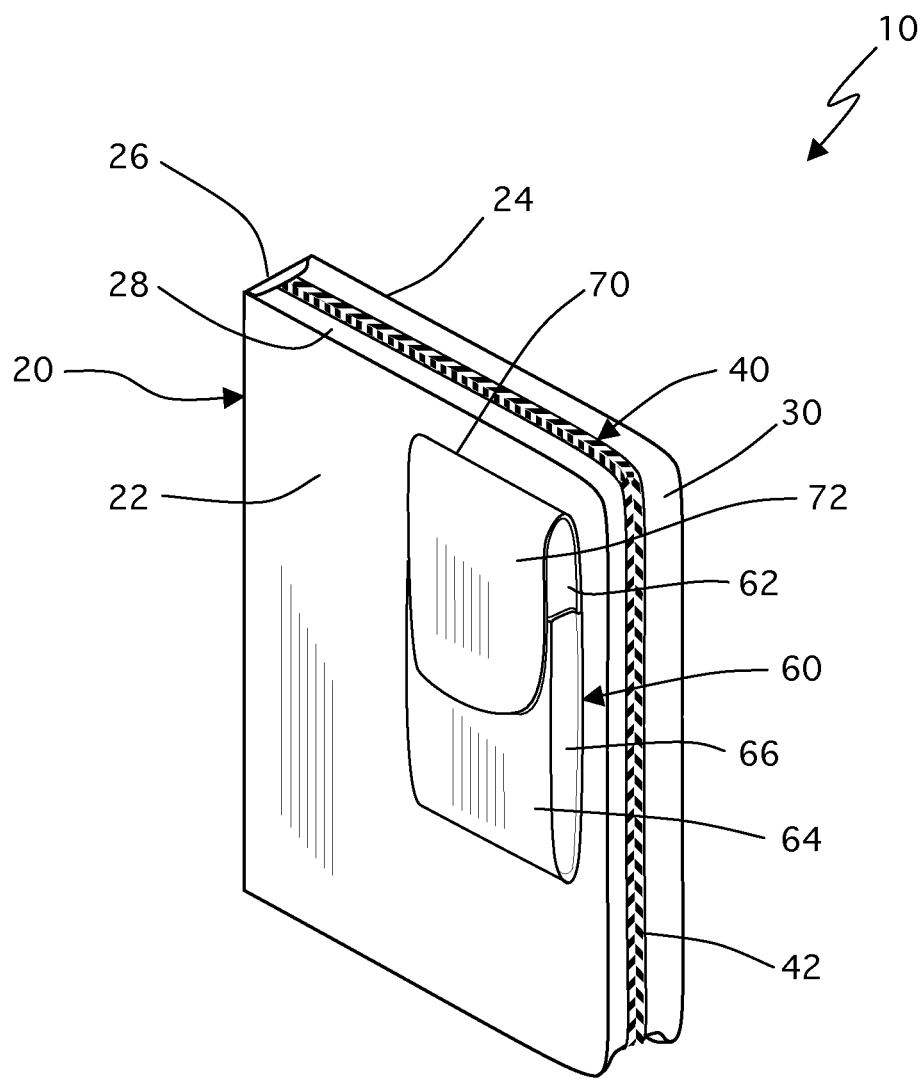
FIG. 1 is an isometric view of the instant invention in a closed configuration.

Referring now to the drawings, the present invention is a portfolio having integrated computer pockets and accessory pockets, and is generally referred to with numeral 10. It can be observed that it basically includes case 20 having zipper assembly 40, exterior pocket assembly 60, and interior compartment assembly 130.

Figure 2:
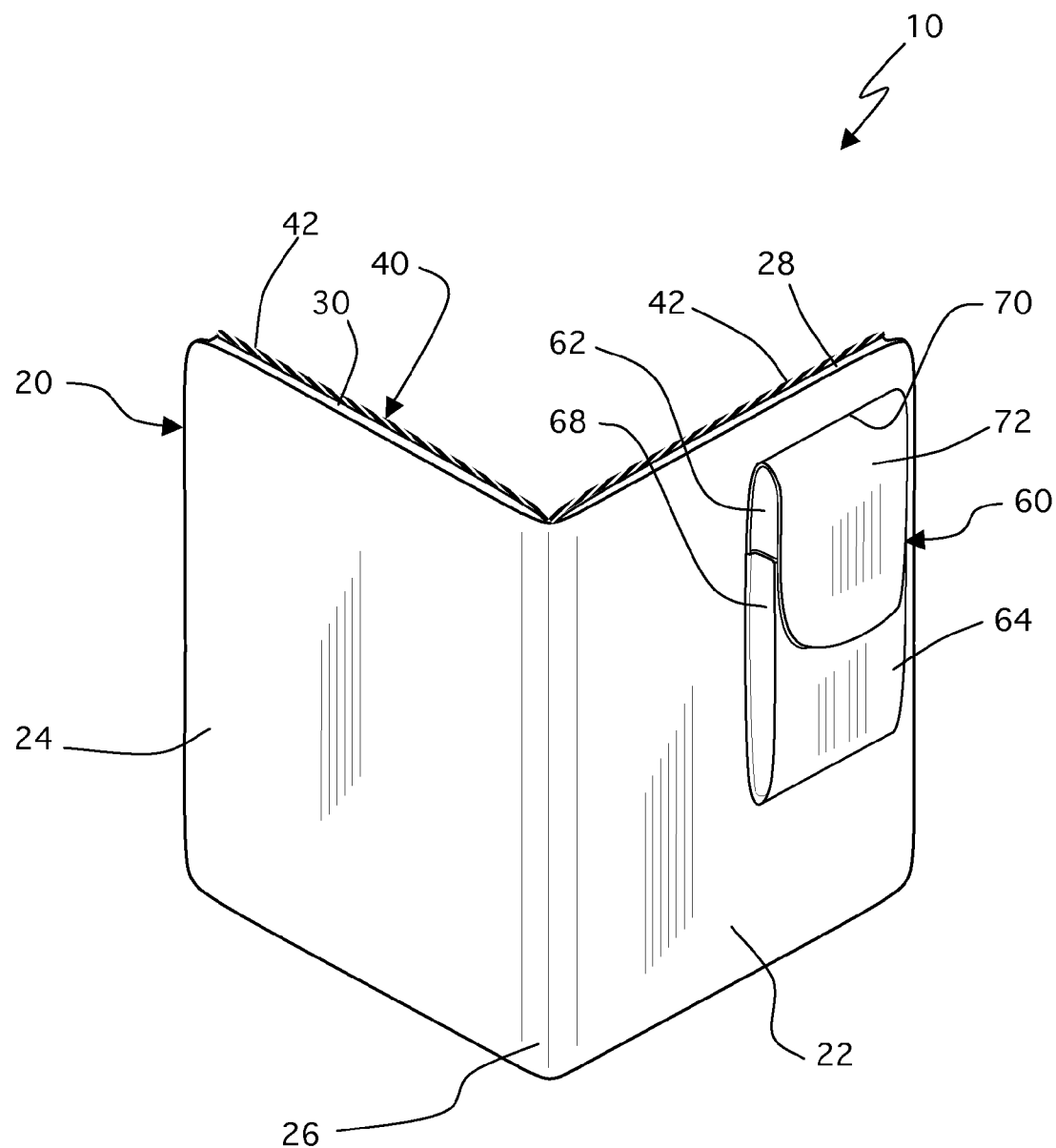
FIG. 2 is an isometric exterior view of the instant invention in an open configuration.

As seen in FIGS. 1 and 2, case 20 comprises front exterior face 22 and rear exterior face 24 connected to each other by spine 26 at an exterior longitudinal side. Front exterior face 22 and rear exterior face 24 comprise sidewalls 28 and 30 respectively. Assembled onto sidewalls 28 and 30 is zipper assembly 40 comprising zipper teeth 42. Exterior pocket assembly 60 comprises rear wall 62, front wall 64, and sidewalls 66 and 68. Rear wall 62 has edge 70. In a preferred embodiment, front wall 64 and sidewalls 66 and 68 are shorter than rear wall 62. Flap 72 extends from edge 70 a predetermined distance to overlap front wall 64. Locking means, not shown, may be mounted to flap 72 and front wall 64 to keep flap 72 closed. Such locking means may include, but are not limited to, hook and loop fasteners, magnets, a button, a clasp assembly, or any similar means to keep flap 72 closed over front wall 64. Rear wall 62 is attached to front exterior face 22. Exterior pocket assembly 60 has cooperative dimensions and shape to receive an electronic device such as a cell phone, computer, or calculator therein.

Figure 3:
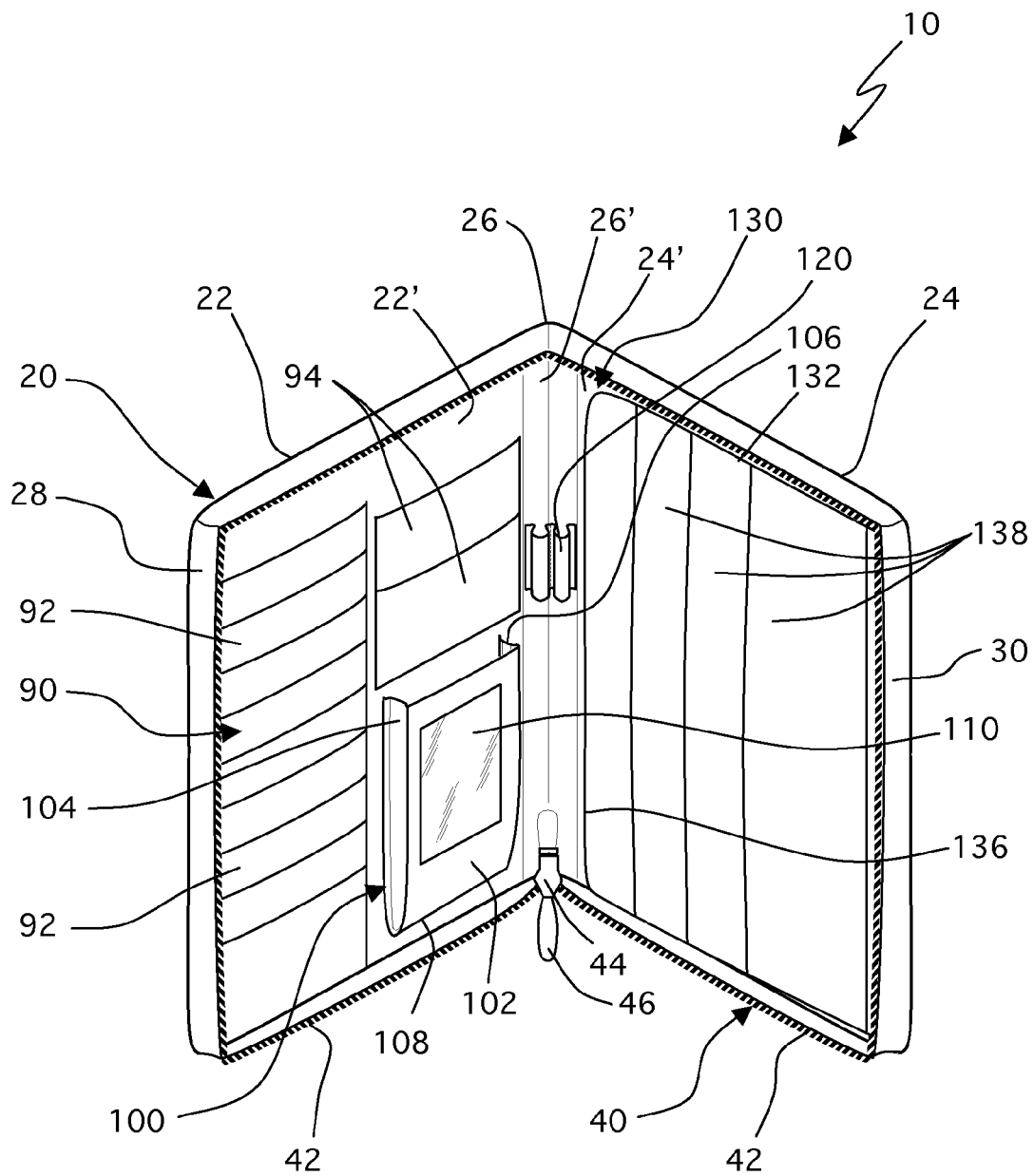
FIG. 3 is an isometric interior view of the instant invention in the open configuration.
Figure 4:
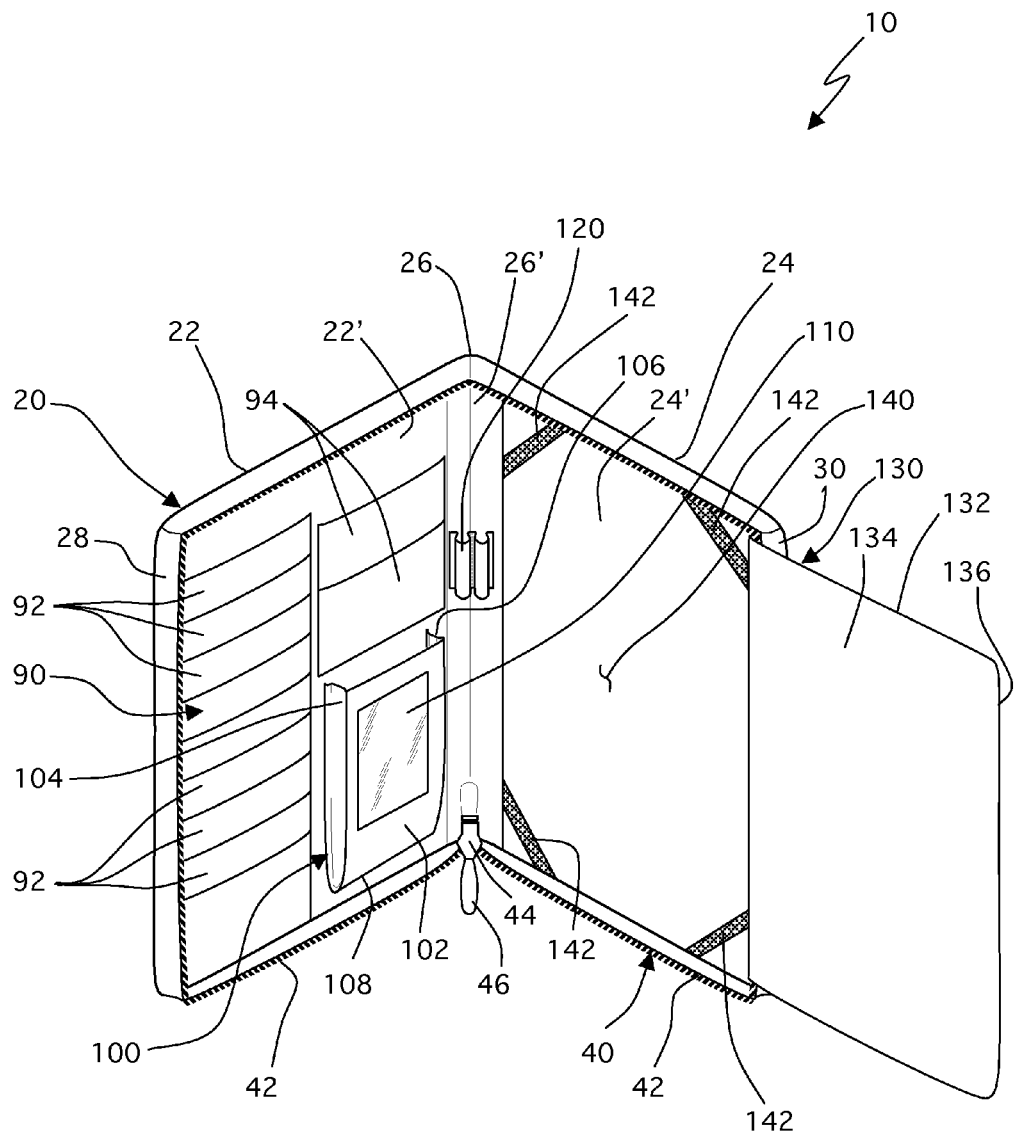
FIG. 4 is an isometric interior view of the instant invention in the open configuration and its interior compartment assembly also in an open configuration.

As seen in FIGS. 3 and 4, zipper assembly 40 further comprises slide 44 with pull-tab 46. Case 20 further comprises front interior face 22' and rear interior face 24' connected to each other by interior spine face 26' at an interior longitudinal side. Interior pocket 100 comprises front wall 102 having transparent window 110, end 108, and sidewalls 104 and 106. End 108, and sidewalls 104 and 106 are attached to front interior face 22'. Interior pocket 100 has cooperative dimensions and shape to receive business cards, and/or an electronic device such as a cell phone, computer, or calculator therein. Front interior face 22' has slot assembly 90 comprising at least one slot 92 and at least one slot 94. At least one slot 92 is smaller than at least one slot 94 and are used to store debit cards, credit cards, business cards and other matter having a cooperative shape and dimension to fit therein. At least one slot 94 is vertically aligned with interior pocket 100. Writing instrument fasteners 120 are mounted to interior spine face 26'.

Interior compartment assembly 130 is affixed and cooperates with rear interior face 24'. Interior compartment assembly 130 comprises cover 132. Cover 132 comprises edge 136 and at least one pocket 138. At least one pocket 138 is perpendicular to at least one slot 92 and at least one slot 94. At least one pocket 138 is used to store documents and other matter having a cooperative shape and dimension to fit therein.

Rear interior face 24' and interior compartment assembly 130 comprising interior face 134 define cavity 140. Rear interior face 24' comprises at least one elastic band 142. In a preferred embodiment, rear interior face 24' comprises four elastic bands 142, disposed diagonally in corners of cavity 140 as illustrated. More specifically, two elastic bands 142 are mounted from interior spine face 26' to first and second sidewalls 30 respectively, and the other two elastic bands 142 are mounted from the first and second sidewalls 30 to a third sidewall 30. Interior compartment assembly 130 comprising interior face 134 to define cavity 140 stores computers, laptops, electronic tablets, documents, and other matter having a cooperative shape and dimension with elastic bands 142 to secure therein. Cover 132 covers the computers, laptops, electronic tablets, documents, and other matter having a cooperative shape and dimension for additional protection when instant invention is in the closed configuration as illustrated in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portfolio with integrated computer and accessory pockets, comprising:
  A) a case having a zipper assembly, said case further comprises a front interior face and a rear interior face connected to each other by an interior spine face at an interior longitudinal side, mounted onto said front interior face is an interior pocket, said case further comprises an interior compartment assembly that is affixed and cooperates with said rear interior face, said rear interior face and said interior compartment assembly comprising an interior face define a cavity, said rear interior face comprises elastic bands disposed diagonally in corners of said cavity, said interior pocket comprises a first front wall having a transparent window, an end, and first and second sidewalls, said end and said first and second sidewalls are attached to said front interior face, said interior spine face has writing instrument fasteners mounted thereon, said front interior face has a slot assembly comprising at least one smaller slot and at least one larger slot having a first cooperative dimension and shape to receive debit cards, credit cards, and/or business cards, said interior compartment assembly comprises a cover comprising an edge and at least one pocket perpendicular to said at least one smaller slot and said at least one larger slot, said at least one pocket having a second cooperative dimension and shape to fit documents therein; and
  B) an exterior pocket assembly having a third cooperative dimension and shape to receive an electronic device, said exterior pocket assembly comprises a rear wall, a second front wall, and third and fourth sidewalls, said rear wall has an edge, extending from said rear wall is a flap, wherein said second front wall, said rear wall and said flap are formed from a single continuous piece of material, said second front wall and third and fourth sidewalls are shorter than said rear wall, said third and fourth sidewalls define a space between said flap and said rear wall when said flap extends from said edge a predetermined distance to overlap said second front wall, said rear wall is attached to a front exterior face of said case.

2. The portfolio with integrated computer and accessory pockets set forth in claim 1, further characterized in that said electronic device is a cell phone, computer, or calculator.

3. The portfolio with integrated computer and accessory pockets set forth in claim 1, further characterized in that said case comprises said front exterior face and a rear exterior face connected to each other by a spine at an exterior longitudinal side, said front exterior face and said rear exterior face comprise fifth and sixth sidewalls respectively, assembled onto said fifth and sixth sidewalls is said zipper assembly comprising zipper teeth.

4. The portfolio with integrated computer and accessory pockets set forth in claim 1, further characterized in that said zipper assembly comprises a slide with a pull-tab.

5. The portfolio with integrated computer and accessory pockets set forth in claim 1, further characterized in that said at least one larger slot is vertically aligned with said interior pocket.

6. The portfolio with integrated computer and accessory pockets set forth in claim 1, further characterized in that said elastic bands secure said at least one computer, at least one laptop, at least one electronic tablet, or at least one document within said cavity.

\* \* \* \* \*

UNITED STATES PATENT AND TRADEMARK OFFICE
CERTIFICATE OF CORRECTION

| | | |
|---|---|---|
| PATENT NO. | : 9,056,696 B1 | Page 1 of 1 |
| APPLICATION NO. | : 13/873694 | |
| DATED | : June 16, 2015 | |
| INVENTOR(S) | : Armando Reyes | |

It is certified that error appears in the above-identified patent and that said Letters Patent is hereby corrected as shown below:

Title page, item (74), the correct Attorney, Agent or Firm is "Albert Bordas, P.A."

Signed and Sealed this
Twenty-ninth Day of September, 2015

Michelle K. Lee
*Director of the United States Patent and Trademark Office*